United States Patent [19]

Martin, II

[11] Patent Number: 4,478,305

[45] Date of Patent: Oct. 23, 1984

[54] REAR SUSPENSION FOR A THREE WHEEL VEHICLE

[76] Inventor: Lee R. Martin, II, 3945 N. Bonita St., Spring Valley, Calif. 92077

[21] Appl. No.: 423,643

[22] Filed: Sep. 27, 1982

[51] Int. Cl.³ ............................................. B62D 61/06
[52] U.S. Cl. .................................... 180/215; 180/73.3
[58] Field of Search ...................... 180/73.3, 210, 215, 180/217

[56] References Cited

U.S. PATENT DOCUMENTS

| | | | |
|---|---|---|---|
| 1,445,677 | 2/1923 | Gardner | 180/215 |
| 1,494,364 | 3/1924 | McGrath | 280/282 |
| 1,876,155 | 9/1932 | Stern et al. | 180/217 |
| 2,391,982 | 1/1946 | Kutil | 280/282 |
| 2,425,855 | 8/1947 | Andrews | 180/215 |
| 3,899,040 | 8/1975 | Figura | 180/217 |
| 3,952,824 | 4/1976 | Matschinsky | 180/73.3 |
| 4,081,049 | 3/1978 | Youmans | 180/73.3 |
| 4,287,960 | 9/1981 | McConnell | 180/217 |

Primary Examiner—John A. Pekar
Assistant Examiner—Kenneth R. Rice
Attorney, Agent, or Firm—Frank D. Gilliam

[57] ABSTRACT

An individual wheel rear suspension for a vehicle having a steerable single front wheel and at least a pair of opposed rear wheels each driven from a common power source. The suspension comprises a central driven shaft with each end connected to an axle through a universal joint, the outer ends of the axles are enclosed by a collar member which allows the axles to rotate therein, a torsion bar is connected between each collar member and the central frame member to prevent horizontal displacement of the axles, and two resilient members in the form of hydraulic shock absorber and coil spring combinations are connected between the collar members and the central frame to allow resistive vertical movement of each axle independent of the other.

6 Claims, 3 Drawing Figures

REAR SUSPENSION FOR A THREE WHEEL VEHICLE

BACKGROUND OF THE INVENTION

The invention is directed to independent suspension of the rear wheel of a three wheeled vehicle or the like and more specifically to a rear suspension for a rough terrain three wheel vehicle having both wheels driven by a common driven axle.

A present form of recreation is the use of three wheel vehicles, such as, motorcycles and the like over extremely rough terrain and at considerable speed, such as, off road races and the like. Obviously rides of this type present considerable uncomfortableness to the operators of these vehicles as well as considerable wear and tear to the vehicles.

The following U.S. Patents are directed to the driving of the rear wheels of a three wheel type vehicle: U.S. Pat. Nos. 1,445,677; 1,876,155; and 2,425,855. These teachings are conventional means for driving the rear wheels, all of which include rigidly positioned axles and differential drives. The differential does not allow the simultaneous driving of both axles and the rigid axles do not allow individual flexible suspension of the axles.

In U.S. Pat. No. 4,287,960, the wheels are positioned on the ends of a fixedly positioned axle and the resilient member is positioned between the operator's seat and the axle.

In U.S. Pat. Nos. 1,494,364, and 2,391,982, flexible axles providing individual suspension are shown; however, these teachings do not include any means to provide the flexibility required and a method for driving the wheels.

There has not been an entirely successful driven independently suspended rear axle system for a three wheel vehicle until the emergence of this invention.

SUMMARY OF THE INVENTION

The invention comprises a unique combination of elements that provide a three wheeled motor vehicle with independent suspension of each rear wheel which includes a common driven axle.

Therefore, an important object of this invention is to provide a unique independent suspension system for a three wheeled motor vehicle for use over rough terrain.

Another object of this invention is to provide an independent rear wheel suspension system for a three wheeled vehicle that has a common driven axle.

Another object of this invention is to provide an independent rear wheel suspension system for a three wheeled vehicle having both wheels driven by a chain drive.

Still another object of this invention is to provide an independent rear wheel suspension system for a three wheeled vehicle wherein the wheels can move vertically independent of each other.

Still another object of this invention is to provide an independent rear wheel suspension system for a three wheeled vehicle which includes disk brakes carried by the driven axle.

Yet another object of this invention is to provide an independent rear wheel suspension system for a three wheel vehicle that is economical to construct, has the strength to make repeated travels across rough terrain at high speed and provides comfort to the operator of the vehicle.

These and other objects and advantages of this invention, along with features of novelty pertinent thereto, will appear or become apparent in the course of the following description sections.

BRIEF DESCRIPTION OF THE DRAWINGS

In the following drawings which form a part of the specifications and which are to be construed in conjunction therewith, and in which like reference numerals have been employed throughout to indicate like parts in the various views.

DETAILED DESCRIPTION OF THE DRAWINGS

Figure 1:
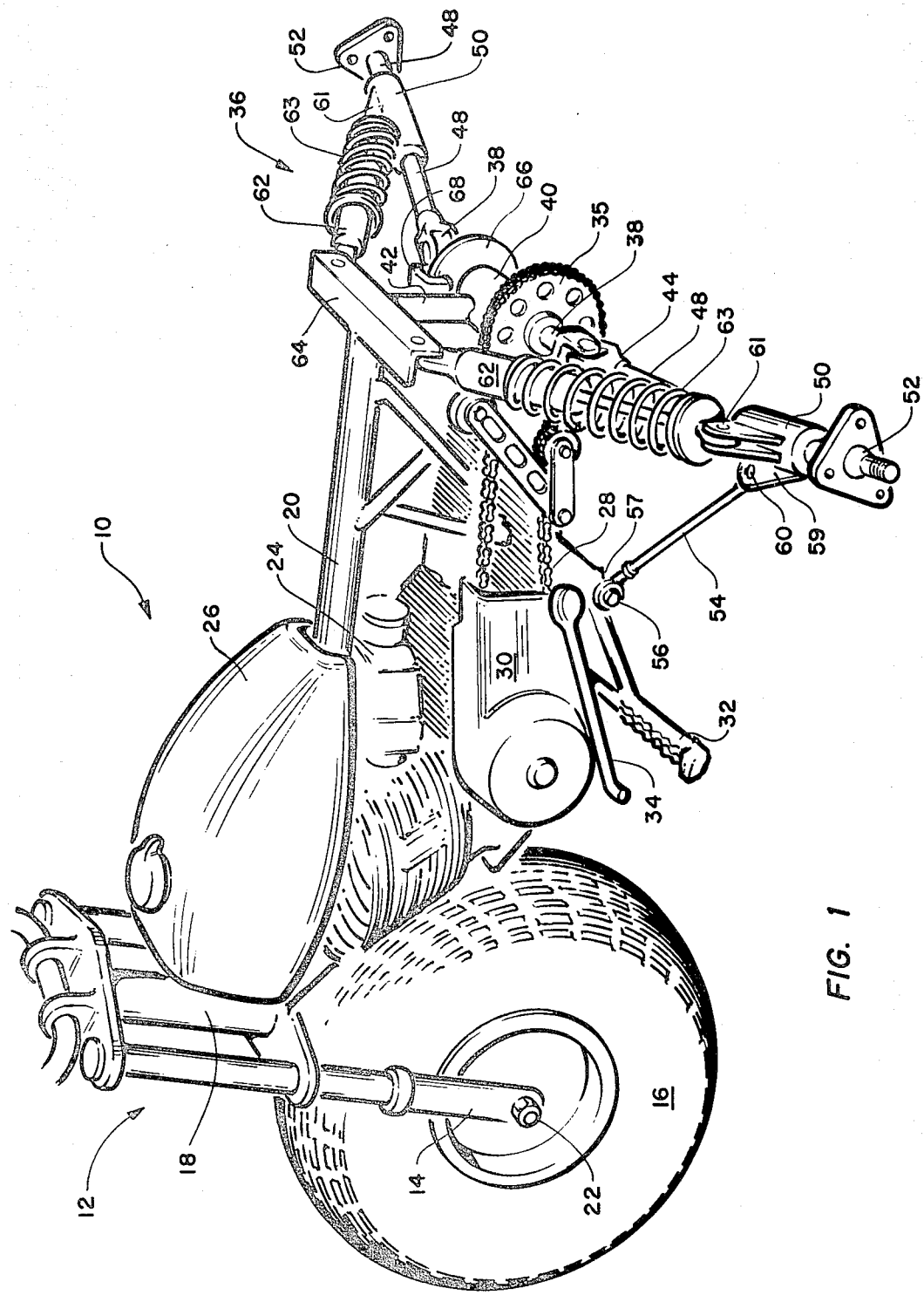
FIG. 1 is a partial perspective view of a three wheeled motor vehicle with the unique suspension system of the instant invention.

Referring now to the figures of the drawings and specifically to FIG. 1, the rear suspension of the invention is shown mechanically mounted on a three wheeled motorcycle 10. The motorcycle 10 includes a front fork 12; with a pair of shock absorber mounts 14, one shown, attached to a front wheel 16 in a conventional manner. The wheel 16 is steerable about frame pivot 18 by conventional handle bars or the like, not shown. A longitudinal frame member 20 extends substantially the length between the front fork 12 and the axle 28; an engine or motor 24; and a fuel tank 26. The motor drives the rear axle in a conventional manner via the chain 28, the forward portion of which is covered by a safety cowl 30. A foot peg 32 extends outward from the frame 20 on both sides of the vehicle, one shown, in a conventional manner. A transmission, not shown, is in series between the engine 24 and the chain 28. The gear ratio of the transmission is changed in a conventional manner by use of the foot shift lever 34. The chain 28 rotates sprocket 35 fixedly attached to a driven shaft 38.

Figure 2:
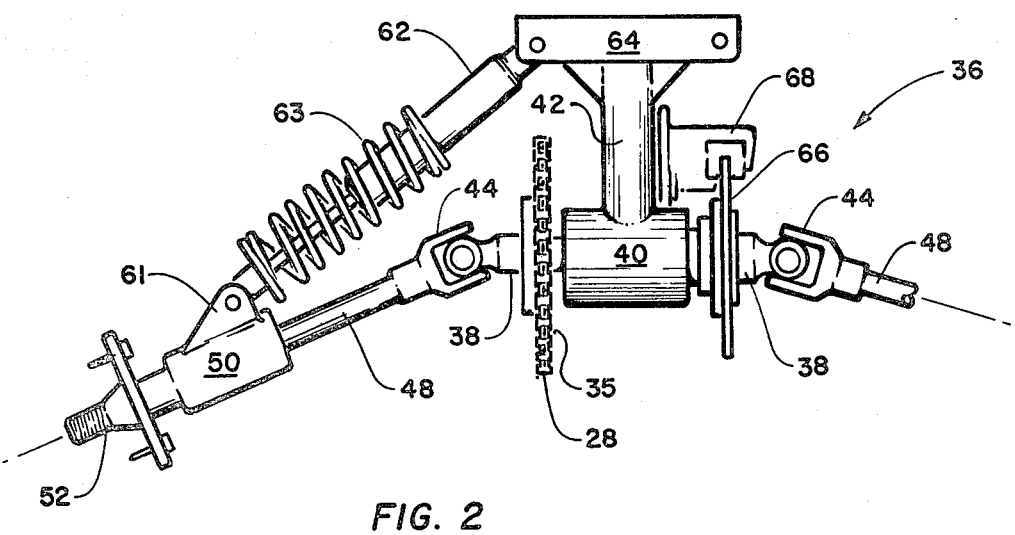
FIG. 2 is a partial rear view thereof.

Referrng to the various drawing figures and particularly to FIG. 2, the independent rear suspension 36 of the invention is shown. The driven shaft 38 is rotatably connected through a tubular bushing 40 which is fixedly attached to the distal end of a downward directed extension 42 of the frame member 20. The driven shaft generally rotates within a friction reducing bearing surface, suitable annular bearing or the like within the tubular bushing 40. These bearings are well known in the art and require no specific description. At each end of the driven shaft 38, a yoke of a conventional universal joint 44 is fixedly attached to an associated axle 48 which has a wheel, not shown, similar to the front wheel 16, attached at its distal end. A housing 50, surrounds each axle end adjacent the wheel connection 52. The axles 48 rotate within these housing 50 and the housing inner surface includes bearings or the like as hereinbefore described in connection with the tubular bushing 40.

Figure 3:
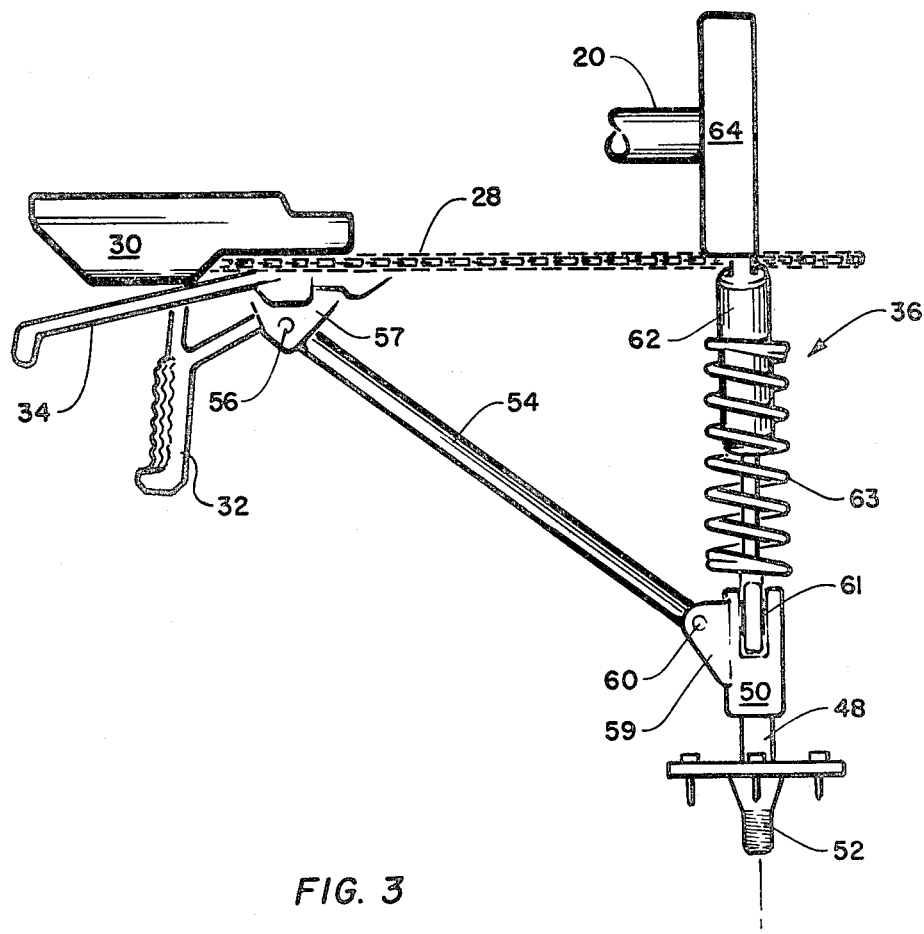
FIG. 3 is a partial plan view thereof.

Referring now specifically to FIG. 1 and 3, a pair of control arms 54, the one in the foreground shown, are connected between a protrusion 59 located on each housing 50 and the protrusion 57 located on the central frame member 20. The end of the control arms are pivotly connected at their respective ends at pivot points 56 and 60 by conventional means, such as, by tapered shafts, lock/nut combinations with the center surface of the bolt smooth, or any other convenient attachment means. The pivotal attachments 56 and 60 allow the axles to pivot vertically while preventing substantially any horizontal movement.

Referring now specifically to FIGS. 1 and 2, pivotly attached to the upper surface of housing 50, at protrusion 61 is a conventional shock absorber 62 and coil spring 63 combination. The opposite end of the combination shock absorber and coil spring is pivotly attached to the cross-bar member 64 which is fixedly attached to the frame member 20. The shock absorber and coil spring combination is shown attached to the housing 50 and cross-bar member 64 by means of a bolt and nut the same as aforementioned, it may, however, be attached by other conventional manners.

The shock absorber and coil spring combination 62 and 63 respectively may have any selected amount of resilience which is dictated by the type of terrain over which the vehicle will travel, the weight of the rider, the ride comfort required, etc., or any combination thereof.

It is conceivable that either a hydraulic type shock, a pneumatic type shock or the like may be used to practice this invention, that a separate shock and spring could be used or that a leaf spring pivotable at each end could be used with a selected shock absorber.

Referring again specifically to FIGS. 1 and 2, a conventional disk 66 for a disk brake is shown. The disk 66 works in conjunction with caliper assembly 68 attached to frame member 20 for stopping the rotation of the driven shaft 38 in a conventional known manner.

Although the described embodiment of the invention depicts a chain drive system it should be understood that a drive shaft system known in the motorcycle art could be utilized equally as well to successfully practice this invention.

The materials of construction are selected from metals, plastics or the like that are suitable for their intended purpose.

It should be quite obvious that the driven shaft 38 is in turn driven by the motor which in turn rotates the sprocket 35 which rotates the axle shafts 48 which turns the wheel, not shown, regardless of the vertical position of either axle shaft/wheel side of the suspension system while torsion bars 54 prevent horizontal movement of the suspension system.

From the foregoing, it will be seen that this invention is one well adapted to obtain all of the ends and objects herein set forth, together with other advantages which are obvious and which are inherent to the structure.

As many possible embodiments may be made of the invention without departing from the scope thereof, it is to be understood that all matter herein set forth or shown in the accompanying drawing figures is to be interpreted as illustrative and not in a limiting sense.

What is claimed is:

1. An improved suspension for rear wheels of a motor driven vehicle having a single steerable front wheel and two driven rear wheels, said front wheel being carried by a central longitudinally extending frame member comprising:
    a central driven shaft rotatably connected to said central frame member;
    a first and second axle shaft the distal ends of each shaft being directly connected to one of said two driven rear wheels;
    a first and second universal joint each one of which is connected between the end opposite said distal end of one of said first and second axle shafts and opposite ends of said central driven shaft;
    first and second collar members each surrounding one of said axle shafts for relative rotation therewith and positioned inwardly from their associated driven rear wheel toward said central longitudinal frame member;
    first and second control arms pivotally connected between their respective collar member and said central longitudinal frame member forward of said central driven shaft;
    first and second resilient members having the function of vertical control rods are connected between their respective collar members and said central frame member at a location inward from said universal joints thereby forming an acute angle relative to said driven axles;
    whereby said axle shafts are pivotable vertically against the resilience of said resilient members and are substantially fixed in position horizontally with respect to said central longitudinal frame member.

2. The invention as defined in claim 1 wherein said vehicle is chain driven.

3. The invention as defined in claim 1 wherein a brake disk is attached to said central driven shaft.

4. The invention as defined in claim 1 wherein said resilient members comprise coil springs.

5. The invention as defined in claim 1 wherein said resilient members comprise shock absorbers.

6. The invention as defined in claim 1 wherein said resilient members each comprise a combined hydraulic shock absorber and a coil spring there around combination.

* * * * *